(12) United States Patent
Oota et al.

(10) Patent No.: US 8,715,878 B2
(45) Date of Patent: May 6, 2014

(54) POLYMER ELECTROLYTE FUEL CELL, MEMBRANE ELECTRODE ASSEMBLY AND MANUFACTURING METHOD THEREOF

(75) Inventors: Masashi Oota, Tokyo (JP); Yasuhiro Haba, Tokyo (JP)

(73) Assignee: Toppan Printing Co., Ltd. (JP)

( * ) Notice: Subject to any disclaimer, the term of this patent is extended or adjusted under 35 U.S.C. 154(b) by 991 days.

(21) Appl. No.: 12/552,241

(22) Filed: Sep. 1, 2009

(65) Prior Publication Data

US 2010/0062306 A1 Mar. 11, 2010

(30) Foreign Application Priority Data

| Sep. 5, 2008 | (JP) | 2008-228148 |
| Sep. 19, 2008 | (JP) | 2008-241781 |
| Sep. 29, 2008 | (JP) | 2008-249732 |
| Sep. 29, 2008 | (JP) | 2008-249743 |

(51) Int. Cl.
*H01M 8/10* (2006.01)

(52) U.S. Cl.
USPC ............................. 429/479; 429/304; 429/126

(58) Field of Classification Search
None
See application file for complete search history.

(56) References Cited

U.S. PATENT DOCUMENTS

| 7,011,905 B2 * | 3/2006 | Sakamoto et al. | 429/494 |
| 7,056,612 B2 * | 6/2006 | Oh et al. | 429/535 |

FOREIGN PATENT DOCUMENTS

| JP | 09-199138 | 7/1997 |
| JP | 2001-319661 | 11/2001 |
| JP | 2002-216801 | 8/2002 |
| JP | 2003-203646 | 7/2003 |
| JP | 2004-047489 | 2/2004 |
| JP | 2005-108770 | 4/2005 |
| JP | 2005-294123 | 10/2005 |
| JP | 2006-216280 | 8/2006 |
| JP | 2008-027775 | 2/2008 |

OTHER PUBLICATIONS

Decision of Refusal dispatched by JPO on Jun. 25, 2013, in connection with Appl. No. 2008-228148, 5 pgs.
Translation of the Decision of Refusal dispatched by JPO on Jun. 25, 2013, in connection with Appl. No. 2008-228148, 9 pgs.
Japanese Notification of Reasons for Refusal dispatched by JPO on Mar. 19, 2013, in connection with Appl. No. 2008-241781, 3 pgs.
Translation of the Japanese Notification of Reasons for Refusal dispatched by JPO on Mar. 19, 2013, in connection with Appl. No. 2008-241781, 7 pgs.

(Continued)

*Primary Examiner* — Monica Huson
(74) *Attorney, Agent, or Firm* — Squire Sanders (US) LLP

(57) ABSTRACT

The present invention provides a method for manufacturing an MEA with high production efficiency. It is a feature of the present invention that the method for manufacturing an MEA includes coating a first catalyst ink on a substrate to form a coated layer of the first catalyst ink, removing the solvent in the coated layer of the first catalyst ink to form a first electrode catalyst layer, coating an electrolyte ink on the first electrode catalyst layer to form a coated layer of the electrolyte ink, removing the solvent in the coated layer of the electrolyte ink to form a polymer electrolyte membrane, coating a second catalyst ink on the polymer electrolyte membrane to form a coated layer of the second catalyst ink, and removing the solvent in the coated layer of the second catalyst ink to form a second electrode catalyst layer.

11 Claims, 9 Drawing Sheets

(56) References Cited

OTHER PUBLICATIONS

Japanese Notification of Reasons for Refusal dispatched by JPO on Mar. 26, 2013, in connection with Appl. No. 2008-249732, 2 pgs.
Translation of the Japanese Notification of Reasons for Refusal dispatched by JPO on Mar. 26, 2013, in connection with Appl. No. 2008-249732, 4 pgs.
Japanese Notification of Reasons for Refusal dispatched by JPO on Apr. 2, 2013, in connection with Appl. No. 2008-249743, 2 pgs.
Translation of the Japanese Notification of Reasons for Refusal dispatched by JPO on Apr. 2, 2013, in connection with Appl. No. 2008-249743, 3 pgs.
Japanese Notification of Reasons for Refusal dispatched by JPO on Apr. 9, 2013, in connection with Appl. No. 2008-228148, 5 pgs.
Translation of the Japanese Notification of Reasons for Refusal dispatched by JPO on Apr. 9, 2013, in connection with Appl. No. 2008-228148, 10 pgs.

* cited by examiner

POLYMER ELECTROLYTE FUEL CELL, MEMBRANE ELECTRODE ASSEMBLY AND MANUFACTURING METHOD THEREOF

CROSS REFERENCE TO RELATED APPLICATIONS

This application is based on and claims the benefit of priority from the Japanese Patent Application number 2008-228148, filed on Sep. 5, 2008; 2008-241781, filed on Sep. 19, 2008; 2008-249743, filed on Sep. 29, 2008; 2008-249732, filed on Sep. 29, 2008, the entire contents of which are incorporated herein by reference.

BACKGROUND OF THE INVENTION

1. Field of the Invention

The present invention relates to a membrane electrode assembly (MEA), a manufacturing method thereof and a polymer electrolyte fuel cell (PEFC) using the same.

2. Description of the Related Art

A fuel cell is a power generation system in which a reverse reaction of electrolysis of water was performed with a fuel gas (including hydrogen) and an oxidant gas (including oxygen) at an electrode having a catalyst to produce heat and electric power. Fuel cells are attracting attention as a clean energy source of the future and have specific features relative to conventional systems such as high efficiency, a small impact on the environment and a small noise. According to the types of ion conductor, fuel cells are divided into several types including PEFC, in which an ion conducting polymer membrane is used.

Among various fuel cells, PEFC is considered as a promising fuel cell for use in a vehicle and a household stationary power supply etc. and is being developed widely in recent years. A complex unit which has a pair of polymer electrode layers on both sides of a polymer electrolyte and which is called a membrane electrode assembly (MEA) is arranged between a pair of separators, on which gas flow paths for supplying a fuel gas including hydrogen to one of the electrodes and an oxidant gas including oxygen to the other electrode is formed, in the PEFC. The electrode for supplying a fuel gas is called a fuel electrode, whereas the electrode for supplying an oxidant gas is called an air electrode hereafter. Each of the electrodes includes an electrode catalyst layer, which has stacked electrolytes along with carbon particles on which a catalyst such as a noble metal of platinum group is loaded, and a gas diffusion layer which has gas permeability and electron conductivity.

In order to improve performances of such a PEFC, a variety of manufacturing methods of an MEA are conventionally investigated. For example, the following methods are known: a method in which an electrode with a catalyst layer is formed by coating a coating liquid on an ion-exchange membrane followed by fabricating an MEA by combining the electrode and an ion-exchange membrane by a heat treatment such as hot-pressing, a method in which a catalyst layer is formed on a substrate film which is arranged besides an ion-exchange membrane and then the catalyst layer is transferred to the ion-exchange membrane by stacking an ion-exchange membrane onto the catalyst layer and performing hot-pressing, a method in which an electrode sheet having a catalytic function and gas diffusion properties is fabricated and then the sheet and an ion-exchange membrane are combined together, and a method in which a pair of half cells (a half cell is a pre-product obtained by forming a catalyst layer on an ion-exchange membrane) are fabricated and they are press-laminated together with both ion-exchange membrane's sides facing each other so that an MEA is obtained.

These manufacturing methods of an MEA, however, have a problem of decrease in production efficiency due to a long tact time since the ion-exchange membrane and the electrode catalyst layer are combined by thermocompression such as hot press, which may often be a critical (bottleneck) process. The tact time is shortened by performing the thermocompression with a higher temperature and higher pressure. In such a case, however, the catalyst layer may become too dense to retain diffusion properties and drainage properties, and the polymer electrolyte membrane may be degraded by heat so that the ion conductivity and mechanical strength is decreased. In the method in which an electrode catalyst layer is formed by coating a coating liquid on the gas diffusion layer, which may be used most among the methods mentioned above, there are severe risks of gas leakage, MEA voltage falling in a closed circuit, and shorting the anode and cathode. This is because the gas diffusion layer is normally a porous carbon paper or carbon felt, and some carbon fibers projecting to the surface of the gas diffusion layer may damage the electrode catalyst layer or even the ion-exchange membrane. Moreover, since a surface roughness of a carbon paper or carbon felt is generally larger than a thickness of the catalyst layer, it is difficult by this method to manufacture an MEA using a thin ion-exchange membrane which has a thickness, for example, less than (or equal to) 20 μm.

In contrast, a manufacturing method of a sequential-stacking type MEA, in which a first electrode catalyst layer is formed followed by forming a polymer electrolyte layer next and a second electrode catalyst layer last, has a short tact time, high production efficiency, and a low manufacturing cost. This manufacturing method, however, has problems of a decrease in a mechanical strength of the MEA, and inferior gas diffusion properties and drainage properties of the electrode catalyst layer. The gas diffusion properties and drainage properties get worse particularly when a high output power operation is performed.

<Patent document 1> JP-A-2004-047489
<Patent document 2> JP-A-2005-294123

SUMMARY OF THE INVENTION

This invention provides an MEA which has high production efficiency, which hardly shows the phenomenon whereby a polymer electrolyte layer and an electrode catalyst layer osmose and blend together, and which improves the gas diffusion properties and drainage properties of the electrode catalyst layer. This invention also provides a manufacturing method of such an MEA and a high power PEFC employing such an MEA.

In order to solve the problems stated above, a first aspect of the present invention is a method for manufacturing an MEA in which a polymer electrolyte membrane is arranged between a first electrode catalyst layer and a second electrode catalyst layer including: coating a first catalyst ink which contains catalyst loaded particles, a polymer electrolyte and a solvent on a substrate to form a coated layer of the first catalyst ink; removing the solvent in the coated layer of the first catalyst ink to form a first electrode catalyst layer; coating an electrolyte ink which contains a polymer electrolyte and a solvent on the first electrode catalyst layer to form a coated layer of the electrolyte ink; removing the solvent in the coated layer of the electrolyte ink to form a polymer electrolyte membrane; coating a second catalyst ink which contains catalyst loaded particles, a polymer electrolyte and a solvent on the polymer electrolyte membrane to form a coated layer of the second catalyst ink; and removing the solvent in the coated layer of the second catalyst ink to form a second electrode catalyst layer.

In addition, a second aspect of the present invention is the method according to the first aspect of the present invention, wherein the polymer electrolyte contained in the first catalyst ink, the polymer electrolyte contained in the electrolyte ink, and the polymer electrolyte contained in the second catalyst ink include a common component material.

In addition, a third aspect of the present invention is an MEA manufactured by the method according to the first aspect of the present invention.

In addition, a fourth aspect of the present invention is a PEFC including the MEA according to the third aspect of the present invention, a pair of gas diffusion layers, and a pair of separators, the MEA being arranged between the pair of gas diffusion layers, and the pair of gas diffusion layers attached to the MEA being arranged between the pair of separators.

In addition, a fifth aspect of the present invention is the method according to the first aspect of the present invention, wherein the solvent is removed at a rate 90% by weight per minute or higher when removing said solvent in the coated layer of the electrolyte ink to form a polymer electrolyte membrane.

In addition, a sixth aspect of the present invention is the method according to the fifth aspect of the present invention, wherein the solvent in the coated layer of the first catalyst ink is removed to an extent of 10% by weight or less relative to an initial solvent amount in the coated layer of the first catalyst ink.

In addition, a seventh aspect of the present invention is the method according to the sixth aspect of the present invention, wherein the solvent in the coated layer of the electrolyte ink is removed to an extent of 5% by weight or less relative to an initial solvent amount in the coated layer of the electrolyte ink.

In addition, an eighth aspect of the present invention is the method according to the fifth aspect of the present invention, wherein the polymer electrolyte contained in the first catalyst ink, the polymer electrolyte contained in the electrolyte ink, and the polymer electrolyte contained in the second catalyst ink include a common component material.

In addition, a ninth aspect of the present invention is an MEA manufactured by the method according to the fifth aspect of the present invention.

In addition, a tenth aspect of the present invention is a PEFC including the MEA according to the ninth aspect of the present invention, a pair of gas diffusion layers, and a pair of separators, the MEA being arranged between the pair of gas diffusion layers, and the pair of gas diffusion layers attached to the MEA being arranged between the pair of separators.

In addition, an eleventh aspect of the present invention is the method according to the first aspect of the present invention, wherein the solvent in the coated layer of the first catalyst ink is removed under a drying condition where a Peclet number Pe is in the range of 1-500.

In addition, a twelfth aspect of the present invention is the method according to the eleventh aspect of the present invention, wherein the solvent in the coated layer of the second catalyst ink is removed under a drying condition where a Peclet number Pe is in the range of 100-1000.

In addition, a thirteenth aspect of the present invention is the method according to the eleventh aspect of the present invention, wherein the polymer electrolyte contained in the first catalyst ink, the polymer electrolyte contained in the electrolyte ink, and the polymer electrolyte contained in the second catalyst ink include a common component material.

In addition, a fourteenth aspect of the present invention is an MEA manufactured by the method according to the eleventh aspect of the present invention.

In addition, a fifteenth aspect of the present invention is a PEFC including the MEA according to the fourteenth aspect of the present invention, a pair of gas diffusion layers, and a pair of separators, the MEA being arranged between the pair of gas diffusion layers, and the pair of gas diffusion layers attached to the MEA being arranged between the pair of separators.

In addition, a sixteenth aspect of the present invention is the method according to the first aspect of the present invention, wherein pores with a diameter of 1-10 μm in said first electrode catalyst layer have a volume in the range of 1-3 cc relative to 1 gram of carbon particles included in the first electrode catalyst layer, and pores with a diameter of 0.01-1 μm in said first electrode catalyst layer have a volume in the range of 2-69 cc relative to 1 gram of carbon particles included in the first electrode catalyst layer.

In addition, a seventeenth aspect of the present invention is the method according to the sixteenth aspect of the present invention, wherein the polymer electrolyte contained in the first catalyst ink, the polymer electrolyte contained in the electrolyte ink, and the polymer electrolyte contained in the second catalyst ink include a common component material.

In addition, an eighteenth aspect of the present invention is an MEA manufactured by the method according to the sixteenth aspect of the present invention.

In addition, a nineteenth aspect of the present invention is a PEFC including the MEA according to the eighteenth aspect of the present invention, a pair of gas diffusion layers, and a pair of separators, the MEA being arranged between the pair of gas diffusion layers, and the pair of gas diffusion layers attached to the MEA being arranged between the pair of separators.

According to an embodiment of the present invention, it is possible to provide an MEA and its manufacturing method which has high production efficiency since a hot press process, which becomes critical (a bottleneck) in a manufacturing process, is excluded, and which has a high level of ion conductivity since the electrode catalyst layer adheres firmly to a polymer electrolyte membrane layer. In addition, it is possible to provide an MEA and its manufacturing method which has excellent gas diffusion properties and drainage properties since the catalyst layer is not made to be too dense by a pressure.

In addition, according to an embodiment of the present invention, it is possible to provide an MEA and its manufacturing method to improve power generation performance since a gas leakage hardly occurs and a thin polymer electrolyte layer with a thickness less than (or equal to) 20 μm can easily be fabricated because the hot press process is not included.

In addition, according to an embodiment of the present invention, it is possible to provide an MEA and its manufacturing method to make better electrical contact between the polymer electrolyte layer and the electrode catalyst layer and ensure lower ion resistance than in the case where different types of polymer electrolytes are used to manufacture the MEA or in the case where a catalyst layer is transferred to a polymer electrolyte layer to manufacture the MEA.

Moreover, according to an embodiment of the present invention, it is possible to provide an MEA and its manufacturing method to make the first electrode catalyst layer to have excellent gas diffusion properties and drainage properties so that the catalyst is used with a high degree of efficiency.

DESCRIPTION OF REFERENCE NUMERALS AND SIGNS

1: Polymer electrolyte membrane.
1": Electrolyte ink.
1': Coated layer of the electrolyte ink
2: First electrode catalyst layer.
2": first catalyst ink.
2': Coated layer of the first catalyst ink
3: Second electrode catalyst layer.
3": Second catalyst ink.
3': Coated layer of the second catalyst ink
A: MEA (membrane electrode assembly).
S: Support medium.
4: Gas diffusion layer on air electrode side.
5: Gas diffusion layer on fuel electrode side.
6: Air electrode.
7: Fuel electrode.
8: Gas flow path.
9: Cooling water path.
10: Separator.

DETAILED DESCRIPTION OF THE INVENTION

An MEA (membrane electrode assembly), its manufacturing method and a PEFC (polymer electrolyte fuel cell) of the present invention are described below. The present invention is not limited only to the embodiment described below. The present invention can also include derivatives of the embodiment obtained by a minor design change according to knowledge of those skilled in the art.

Figure 1A:
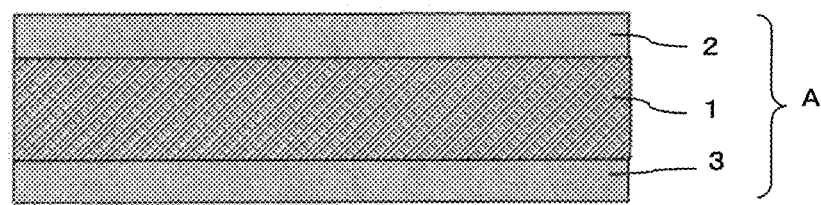
FIGS. 1A and 1B illustrate exemplary cross section diagrams of MEAs of the present invention.
Figure 1B:
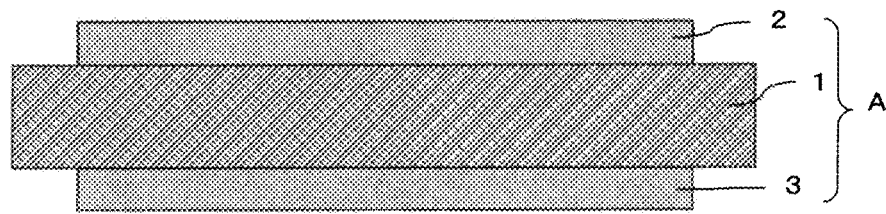

First, an MEA of the present invention is described. FIGS. 1A and 1B show exemplary cross sections of MEAs of the present invention, respectively.

The MEA A of the present invention has electrode catalyst layers 2 and 3 on both sides of a polymer electrolyte membrane 1. In other words, the polymer electrolyte membrane 1 is arranged between the electrode catalyst layers 2 and 3. Catalyst-loaded particles and a polymer electrolyte are included in the electrode catalyst layers 2 and 3. It does not matter whether the electrode catalyst layers 2 and 3 are made of an identical material or not.

The electrode catalyst layers 2, 3 and the polymer electrolyte membrane 1 may have the same sizes as is shown in FIG. 1A. Otherwise, the polymer electrolyte membrane 1 may be larger than the electrode catalyst layers 2 and 3 as is shown in FIG. 1B. In either case, it is necessary to avoid shorting the electrode catalyst layers 2 and 3 or prevent electrical leakage.

Next, an MEA manufacturing method of the present invention is described. FIGS. 2A to 2G are explanatory diagrams of the MEA manufacturing method of the present invention.

Figure 2A:
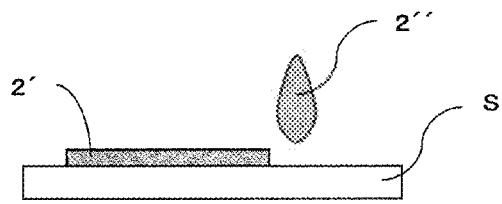
FIGS. 2A-2G are explanatory diagrams of an MEA manufacturing method of the present invention.
Figure 2B:
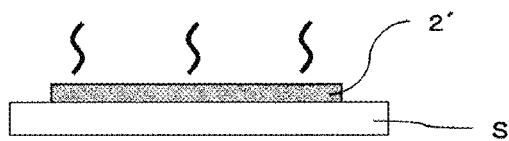

In the MEA manufacturing method of the present invention, a first catalyst ink 2" containing a solvent, a polymer electrolyte and catalyst-loaded particles is prepared. The first catalyst ink 2" is coated on a support medium S to form a coated layer of the first catalyst ink 2' (FIG. 2A). Subsequently, a solvent in the coated layer of the first catalyst ink 2' is removed so that a first electrode catalyst layer 2 is formed on the support medium S (FIG. 2B).

Figure 2C:
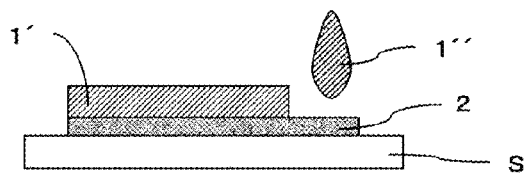
Figure 2D:
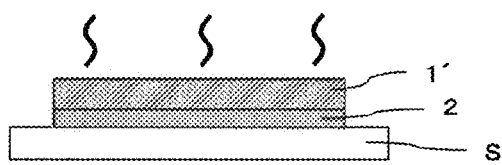

Next, an electrolyte ink 1" containing a solvent and a polymer electrolyte is prepared. The electrolyte ink 1" is coated on the first electrode catalyst layer 2 to form a coated polymer electrolyte layer 1' (FIG. 2C). Subsequently, a solvent in the coated polymer electrolyte layer 1' is removed so that a polymer electrolyte membrane 2 is formed on the first electrode catalyst layer 2 (FIG. 2D).

Figure 2E:
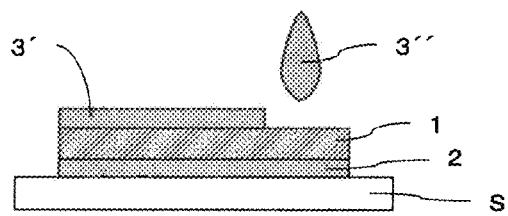
Figure 2F:
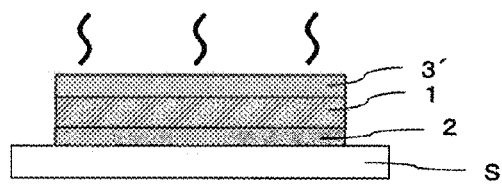

Next, a second catalyst ink 3" containing a solvent, a polymer electrolyte and catalyst-loaded particles is prepared. The second catalyst ink 3" is coated on the polymer electrolyte membrane 1 to form a coated layer of the second catalyst ink 3' (FIG. 2E). Subsequently, a solvent in the coated layer of the second catalyst ink 3' is removed so that a second electrode catalyst layer 3 is formed on the polymer electrolyte membrane 1 (FIG. 2F).

Figure 2G:
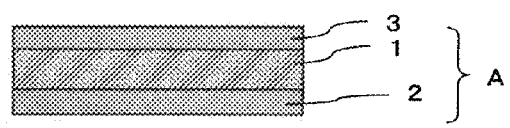

Finally if necessary, an MEA which is composed of the first electrode catalyst layer 2, the polymer electrolyte membrane 1 and the second electrode catalyst layer 3 is peeled off from the support medium S. The MEA A of the present invention is manufactured in this way (FIG. 2G). In the case where a gas diffusion layer or a separator mentioned later is used as the support medium S, there is no need to peel off the MEA A from the support medium S.

The manufacturing method of the MEA A in the present invention, in which the first electrode catalyst layer 2, the polymer electrolyte layer 1 and the second electrode catalyst layer 3 are stacked sequentially, can achieve high production efficiency. Thus, the MEA A of the present invention can be manufactured at a low cost. In addition, the polymer electrolyte layer 1 sufficiently adheres to the first electrode catalyst layer 2 and the second electrode catalyst layer 3 so that ionic resistances at the interfaces can be kept low in the MEA A of the present invention.

The manufacturing method of the MEA A in the present invention requires no hot press process unlike the MEA manufacturing method in which the electrode catalyst layers are transferred to both sides of the polymer electrolyte layer by a hot press process. In the case where no hot press process is performed, it is possible to prevent the polymer electrolyte layer from being damaged by heat and a pressure during the hot press process and decreasing its membrane strength and ion exchange ability.

In addition, the polymer electrolyte layer 1, which is arranged between a pair of electrode catalyst layers, may be thin in the MEA A in the present invention. In the MEA manufacturing method in which the electrode catalyst layers are transferred to both sides of the polymer electrolyte layer by a hot press process, there is a problem that a gas diffusion layer, which is arranged adjacent to an electrode catalyst layer, includes some carbon fibers which stick into the polymer electrolyte layer or the electrode catalyst layers by the hot press process and cause a gas leakage resulting in a decrease in the open circuit voltage of the MEA. In addition, the carbon fibers which stick into the polymer electrolyte layer or the electrode catalyst layers by the hot press process may also cause an electrical shortage during power generation. Therefore, it is necessary to make the polymer electrolyte layer sufficiently thick in the MEA manufacturing method in which the electrode catalyst layers are transferred to both sides of the polymer electrolyte layer by a hot press process.

In contrast, the MEA manufacturing method of the present invention allows for a thinner polymer electrolyte layer 1 since the hot press process is not needed. Specifically, the polymer electrolyte layer can have a thickness less than (or equal to) 20 µm. A thinner polymer electrolyte layer allows for a reduction of membrane resistance and improvement of the power generation performance.

In addition, the MEA manufacturing method of the present invention has a feature that a solvent contained in the formed polymer electrolyte layer 1', which is a previous state of the polymer electrolyte layer 1 before a second catalyst ink 3" is coated thereon, is removed at a rate higher than 90 wt %/min. This feature makes it possible to prevent the polymer electrolyte layer 1 from invading (entering) the porous first electrode catalyst layer 2 so as to fabricate an MEA which has a high level of gas diffusion properties and in which a flooding phenomenon hardly occurs.

It is preferable in the MEA manufacturing method of the present invention that the solvent in the coated layer of the first catalyst ink 2' is removed to such an extent that the weight of the residual solvent is lower than (or equal to) 10 wt % of the total weight of the coated layer of the first catalyst ink 2' before it is transformed into the first electrode catalyst layer 2 and the electrolyte ink 1" is coated thereon. It is possible to prevent the first electrode catalyst layer 2 and the electrolyte ink 1" from dissolving or blending together by sufficiently removing the solvent in the coated layer of the first catalyst ink 2' and coating the electrolyte ink 1" on the sufficiently dried first electrode catalyst layer 2.

In addition, it is preferable in the MEA manufacturing method of the present invention that the solvent in the coated polymer electrolyte layer 1' is removed to such an extent that the weight of the residual solvent becomes lower than (or equal to) 5 wt % relative to the total solvent weight in the electrolyte ink 1" before it is transformed into the polymer electrolyte layer 1 and the second catalyst ink 3" is coated thereon. It is possible to prevent the polymer electrolyte layer 1 and the second catalyst ink 3" from dissolving or blending together by sufficiently removing the solvent in the coated polymer electrolyte layer 1' and coating the second catalyst ink 3" on the sufficiently dried polymer electrolyte layer 1.

In addition, it is preferable in the MEA manufacturing method of the present invention that the polymer electrolytes contained in the first catalyst ink 2", in the electrolyte ink 1", and in the second catalyst ink 3" are the same materials. If the same polymer electrolyte materials are contained in the three inks, adhesion between the polymer electrolyte layer 1 and each of the two catalyst layers are improved so that ionic resistance at the interface between the polymer electrolyte layer 1 and each of the catalyst layers can be reduced.

In other words, the present invention provides an MEA in which the polymer electrolyte layer 1 adheres firmly to the first electrode catalyst layer 2 as well as to the second electrode catalyst layer 3 so that ionic resistance at the interfaces between the polymer electrolyte layer 1 and the first electrode catalyst layer 2 or the second electrode catalyst layer 3 by a manufacturing method with high production efficiency. Hence, the present invention provides an MEA having a sufficient power generation performance at a low cost.

It is preferable that a Peclet number (Pe) is in the range of 1-500 as a drying condition of the coated layer of the first catalyst ink after the first catalyst ink is coated in the present invention. If the Peclet number exceeds 500, pores in the first electrode catalyst layer are formed non-uniformly, thereby drainage properties of the first catalyst layer decrease and a flooding phenomenon easily occurs. If the Peclet number is less than 1, it becomes difficult to manufacture the MEA normally. It is more preferable that the Peclet number is in the range of 1-400.

It is preferable that the second electrode catalyst layer is formed under a drying condition where the Peclet number is in the range of 100-1000. If the Peclet number exceeds 1000, pores in the second electrode catalyst layer are formed non-uniformly, thereby drainage properties of the second catalyst layer decrease and a flooding phenomenon easily occurs. If the Peclet number is less than 100, the second catalyst ink and the polymer electrolyte layer blend together to form a mixed layer and the battery performance becomes poor. It is more preferable that the Peclet number is in the range of 200-900.

The Peclet number (Pe) used in the present invention is described below. If the coated layer is formed using a two-component system (particles/solvent) ink, a structure of the coated layer is generally influenced by a drying condition. In the case where particles of only a single type having a certain diameter are dispersed in a solvent of the coated layer and a rate of solvent evaporation from the layer surface (layer thinning rate) is larger than a rate of diffusion by Brownian motion (Brownian diffusion rate), the particles are inclined to gather on the surface in a perpendicular direction so that the coated layer becomes non-uniform. On the other hand, in the case where the diffusion by Brownian motion is larger, the particles are uniformly distributed due to a sufficient diffusion in the solvent. A ratio of a layer thinning rate E (m/s) and a Brownian diffusion rate D/H (m/s) is referred to as a Peclet number and can be expressed as $$Pe = EH/D \qquad \text{(formula 1)}$$

where the layer thinning rate E (m/s) is a decreasing rate in the layer thickness direction and can be obtained by dividing an amount of layer thickness loss during drying by drying time. D (m$^2$/s) is a Brownian diffusion coefficient and H (m) is a wet layer thickness just after being coated.

When R (m) is a radius of the particles, u is a viscosity of the coating liquid, T is a drying temperature (K), and k is the Boltzmann constant, the following relations are produced:

$$D = kT/6\pi uR \qquad \text{(formula 2)}$$

which gives $$Pe = 6\pi EHR/kT \qquad \text{(formula 3)}$$

In general, each of the catalyst inks which include catalyst loaded particles, a polymer electrolyte and a solvent, and the electrolyte ink which includes a polymer electrolyte and a solvent is a particle dispersion system of various size particles and various types of solvents are also used. The inventors, however, found that even in the case of such an ink, the Peclet number affects a structure of the resultant MEA, and thereby governs mechanical strength, gas diffusion properties and drainage properties of the electrode catalyst layers. The radius of the catalyst loaded particles was used as the radius of the particles at this time.

It is preferable in the present invention that the total volume of pores having a diameter in the 1-10 μm range is in the range of 1-3 cc relative to 1 g of carbon particles included in the first electrode catalyst layer just after being formed. In addition, it is preferable in the present invention that the total volume of pores having a diameter in the 0.01-1 μm range is in the range of 2-6 cc relative to 1 g of carbon particles included in the first electrode catalyst layer just after being formed.

The total volume of pores in the first electrode catalyst layer just after being formed can be controlled by changing the drying temperature and the drying rate of the first catalyst ink after being coated. In addition, it can also be controlled by changing the particle dispersion condition or adding a pore forming agent etc.

The catalyst material is used loaded on a conductive carrier. Any known conductive carrier can be used as the conductive polymer. A carbon particle is a representative material of the conductive polymer. Specifically, carbon black, acetylene black, ketjen black, carbon nanotube and fullerene etc. are examples of the carbon particle and can be used in the present invention. The size (diameter) of the conductive particle is preferred to be in the range of 10-1000 nm because it becomes difficult to form a path for electron conduction if the conductive particle is too small, whereas the gas diffusion properties of the electrode catalyst layer decrease and catalytic efficiency falls if the conductive particle is too large. It is more preferable that the size (diameter) of the conductive particle is in the range of 10-100 nm.

The polymer electrolyte material in the present invention is not limited as long as it has ionic conduction properties. Polymer electrolytes of perfluoro sulfonated membrane, for example, commercial products such as Nafion (a registered trademark of Dupont), Flemion (a registered trademark of Asahi Glass Co., Ltd.) and Aciplex (a registered trademark of Asahi Kasei Corp.) etc. can be used. In addition, carbon hydride electrolytes such as sulfonated poly(ether ether ketone) (PEEK), sulfonated poly(ether sulfone) (PES) and sulfonated polyimide (PI) etc. can also be used.

It is preferable that the viscosity of the polymer electrolyte solution contained in the electrolyte ink used in the present invention is in the range of 50-400 mPa. It is because the electrolyte ink easily infiltrates (enters) pores in the catalyst layer resulting in a severe decrease in the gas diffusion properties if the viscosity is less than 50 mPa, whereas it becomes difficult to coat the ink if the viscosity exceeds 400 mPa. It is more preferable that the viscosity is in the range of 100-200 mPa.

There are no particular limitations to the solvent used as a dispersion medium as long as it does not chemically react with the catalyst loaded particles and the polymer electrolyte. It is, however, preferable that at least a volatile organic solvent is contained in the solvent used as a dispersion medium. For example, alcohols such as methanol, ethanol, 1-propanol, 2-propanol, 1-butanol, 2-butanol, isobutyl alcohol, t-butyl alcohol and pentanol etc., ketone solvents such as acetone, methyl ethyl ketone, pentanone, methyl isobutyl ketone, heptanone, cyclohexanone, methylcyclohexanone, acetonylacetone and diisobutyl ketone etc., ether solvents such as tetrahydrofuran, dioxane, diethylene glycol dimethyl ether, anisole, methoxytoluene and dibutyl ether etc., other polar solvents such as dimethylformamide, dimethylacetoamide, N-methylpyrrolidone, ethylene glycol, diethylene glycol, diacetone alcohol and 1-methoxy-2-propanol etc. are used. Mixed solvents obtained by blending a plurality of these solvents can also be used.

In addition, it is preferable that lower alcohols are used as a mixed solvent with water since they are ignitable. There are no particular limitations to the amount of water to be added as long as the electrolyte does not turn into a gel nor separate from the water and become clouded.

Any known means, for example, a stirred bubble eliminator and a planetary ball mill (but not limited to these) etc. can be used in mixing the ink of the present invention. It is preferred (but not necessary) to disperse the ink under an atmosphere of inactive gas since the solvent can be oxidized with dissolved oxygen by the catalyst.

Any known means, for example, a planetary ball mill, a beads mill and a homogenizer (but not limited to these) etc. can be used in mixing the catalyst ink of the present invention. Although it is preferred (but not necessary) to disperse the catalyst ink under an atmosphere of inactive gas since the solvent can be oxidized with dissolved oxygen by the catalyst, it is also possible to disperse the catalyst ink under air if necessary.

It is preferable that an amount of solid content including catalyst loaded conductive particles and proton conductive polymer in the catalyst ink of the present invention is in the range of 5-45% by weight relative to the total amount of the solvent. If the amount of the solid content is not within this range, the ink lacks stability and it becomes harder to print with this ink. It is preferable that a viscosity of the ink of the present invention is in the 50-800 mPa range. As long as these fall within these ranges, the amount of solid content and the viscosity of the ink may be more precisely adjusted in accordance with the printing method.

It is preferable that the second catalyst ink has a larger amount of solid content than the first catalyst ink. This is because the polymer electrolyte layer swells as the solvent is added and shrinks as the solvent is evaporated thereby microcracks develop on the polymer electrolyte layer itself and/or on the electrode catalyst layer and the MEA wrinkles. Such an MEA causes a leakage of the supply gases resulting in a problem of a decrease in battery performance. Hence, it is preferable that a second ink with a larger amount of solid content, which does not swell the polymer electrolyte layer as much and causes a smaller shrinkage. Specifically, it is preferable that the second ink has solid content in the range of 6-15% by weight.

A thickener and/or a dispersant may be added to the catalyst ink of the present invention if necessary. Although a sulfonated amorphous carbon, a solid acid is a typical preferable dispersant for carbon particles, the present invention is not limited to this.

A defoamed ink is preferred to be used as the catalyst ink.

Known methods such as a spray method, a screen printing method, a doctor blade method, a gravure printing method, a die coating method and an ink-jet method can be employed as the coating method for the catalyst ink of the present invention. This invention, however, is not in particular limited to these methods.

A metal plate, a carbon mold, a glass plate, a carbon paper, a plastic film and a plastic plate can be used as the substrate on which the first electrode catalyst ink is coated.

The metal plate may be made of a single metal or an alloy. The carbon mold and the glass plate may be made of porous or non-porous material. These substrate materials may receive a hydrophilic treatment on the surface. These substrate materials may also be used as the separator if a flow path is preliminarily formed before the electrode catalyst ink is coated.

Any type of carbon can be used as the carbon paper as long as it has good electrical conductance and gas diffusion properties. The carbon paper may receive a hydrophobic or hydrophilic treatment etc. such as a coating of carbons dispersed in a fluororesin on the surface.

Any films of a hydrocarbon such as polyimide, polyethylene terephthalate (PET), polyaramid, polyamide (Nylon), polysulfone, polyethersulfone, polyphenylsulfone, polyphenylene sulfide, polyetheretherketone, polyether imide, polyacrylate and polyethylene naphthalate etc., or films of a thermoresistive fluororesin such as ethylene tetrafluoroethylene copolymer (ETFE), tetrafluoroethylene hexafluoropropylene copolymer (FEP), tetrafluoroethylene perfluoroalkyl vinyl ether copolymer (PFA) and polytetrafluoroethylene (PTFE) can be used as the plastic film. This invention is not limited to these.

The substrate is preferred to have a small average roughness on a center line Ra. Specifically, Ra less than (or equal to) 5 μm is preferable, and less than (or equal to) 1 μm is more preferable. This is because it becomes difficult to form the catalyst layer and the electrolyte plane stably if the Ra is large.

Various drying methods such as drying with hot air and drying by IR (infrared light) etc. can be adopted as the drying method for the coated layer of the first catalyst ink, the coated layer of the second catalyst ink and the coated layer of the electrolyte ink. The present invention is not limited by the drying method. Any drying method may be used in drying the coated layer of the first catalyst ink and the coated layer of the second catalyst ink as long as the Pe condition is appropriate. For example, in the case where the Nafion is used as the polymer electrolyte, a drying temperature lower than (or equal to) 120° C. is preferable and a temperature lower than (or equal to) 100° C. is more preferable. The most appropriate temperature depends on the polymer electrolyte.

In order to increase production efficiency, a short drying time is preferable. Specifically, a drying time less than (or equal to) 10 minutes is desirable.

The second electrode catalyst layer is preferred to be dried gradually under a wet environment. This is because the second electrode catalyst layer cracks if dried in a short time.

The MEA obtained in the present invention is preferred to be used in such a way that the first electrode catalyst layer is arranged as the anode. The MEA obtained in the present invention is inclined to have a dense structure in the first electrode catalyst layer and a poor structure in the second electrode catalyst layer. In order to make a fuel cell having excellent drainage properties in which the flooding phenomenon hardly occurs, it is preferred to arrange the first electrode catalyst layer on the anode.

Figure 3:
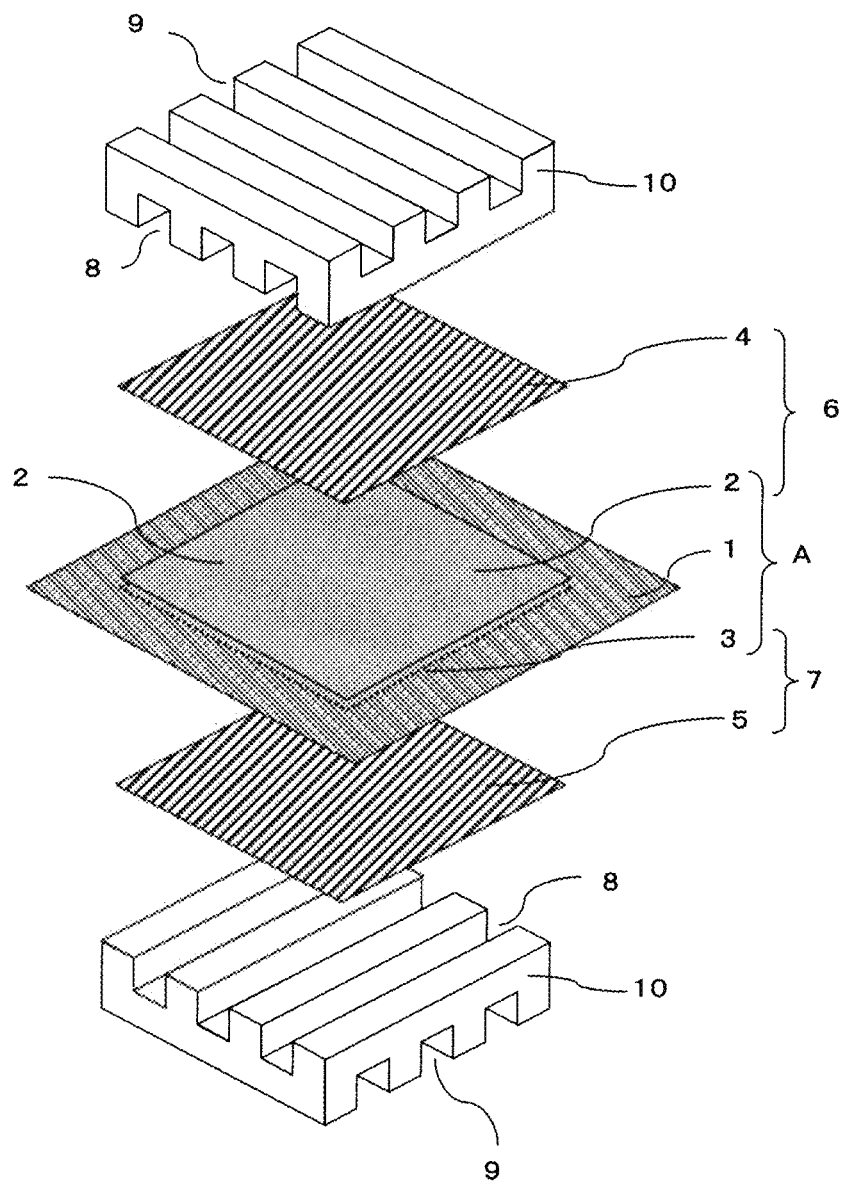
FIG. 3 shows an exemplary exploded view of a PEFC of the present invention.

The PEFC of the present invention is described below. FIG. 3 shows an exemplary exploded view of the PEFC of the present invention.

In the PEFC of the present invention, a gas diffusion layer 4 on the air electrode (cathode) side and a gas diffusion layer 5 on the fuel electrode (anode) side are arranged facing the electrode catalyst layer 2 in the MEA and the electrode catalyst layer 3 in the MEA, respectively. Each of these constitutes the air electrode 6 and the fuel electrode 7. Then, a pair of separators 10, which is made of a conductive impermeable material and has a gas flow path 8 on one surface as well as a cooling liquid path 9 on the other surface, are arranged to the electrodes. A fuel gas, for example, hydrogen gas is supplied through the gas flow path 8 on the separator 10 on the fuel electrode 7 side. Whereas, an oxidant gas, for example, oxygen gas is supplied through the gas flow path 8 on the separator 10 on the air electrode 6 side. The hydrogen (fuel gas) reacts with the oxygen gas under a presence of the catalyst so that an electromotive force is generated between the fuel electrode and the air electrode.

Although FIG. 3 shows a diagram in which the first electrode catalyst layer 2 is arranged on the air electrode 6 and the second electrode catalyst layer 3 is arranged on the fuel electrode 7, it is also possible in the PEFC of the present invention to arrange the first electrode catalyst layer 2 on the fuel electrode 7 and the second electrode catalyst layer 3 on the air electrode 6 if necessary.

Although in FIG. 3, the PEFC has a structure of a so-called single cell, in which the polymer electrolyte membrane 1, the electrode catalyst layers 2, 3 and the gas diffusion layer 4 and 5 are arranged between a pair of separators, the PEFC of the present invention may also have a structure in which a plurality of the single cells are stacked and combined via separator(s) 10.

A material which has electrical conductivity as well as gas diffusion properties can be used as the gas diffusion layer. Specifically, carbon cloth, carbon paper and a porous carbon material such as carbon unwoven are available as the gas diffusion layer. In addition, a gas diffusion layer can be used as the substrate. In this case, it is unnecessary to peel off and remove the substrate (as the gas diffusion layer) after the combining process.

In addition, in the case where the gas diffusion layer is used as the substrate, a filler layer may preliminarily be formed on the gas diffusion layer before the catalyst ink is coated. The filler layer prevents the catalyst ink from seeping into the gas diffusion layer. Even in the case where only a little catalyst ink is used, the ink accumulates on the filler layer and a three-phase boundary is formed. Such a filler layer can be formed by, for example, dispersing carbon particles in a fluororesin solution and sintering the solution at a temperature higher than the melting point of the solution. Poly(tetrafluoroethylene) (PTFE) etc. can be used as the fluororesin.

As the separator, a carbon type separator and a metal type separator etc. can be utilized. In addition, a separator may be combined with the gas diffusion layer. In the case where either the separator or the electrode catalyst layer also plays a role of gas diffusion layer, the gas diffusion layer is not required.

EXAMPLES

This invention is described with examples in detail below. This invention, however, is not limited to these examples.

Example 1

(Preparation of the First Catalyst Ink and the Second Catalyst Ink)

Platinum loaded carbon catalysts and a 20% by mass of polymer electrolyte solution (Nafion: a registered trademark and a product by Dupont.) was mixed in a solvent. A dispersing treatment was performed by a planetary ball mill. The pot and the balls of the ball mill were made of zirconium.

The first catalyst ink and the second catalyst ink were prepared by making the composition ratio by mass of the platinum loaded carbon catalysts and the polymer electrolyte (Nafion: a registered trademark and a product by Dupont.) become 2:1 and dispersing them in a solvent. The solvent was prepared by blending 1:1 in volume of ethanol and methanol. In addition, the amount of the solid content was made to 10% by mass.

(Preparation of the Electrolyte Ink)

20% by weight of Nafion (a registered trademark) solution was purchased from Wako Pure Chemical Industries, Ltd. and was used as the electrolyte ink.

(Thickness of the First Electrode Catalyst Layer)

A polymer film (made of ETFE: poly(ethylene-tetrafluoroethylene) copolymer) was fixed on a glass plate and the catalyst ink was coated on the polymer film by a doctor blade setting a gap between the polymer film and an edge of the blade to be 125 μm. The catalyst layer was obtained by drying the coated ink in an oven at 70° C. for 5 minutes. The amount of platinum loaded on the catalyst layer was adjusted to 0.3 mg/cm$^2$. The catalyst layer was found to have a thickness of about 8 μm by a measurement with a contact-type thickness meter. A residual solvent at this time corresponded to 7.4% by mass of the coated catalyst ink.

(Thickness of the Polymer Electrolyte Layer)

A polymer film (made of ETFE: poly(ethylene-tetrafluoroethylene) copolymer) was fixed on a glass plate and the polymer electrolyte ink was coated on the polymer film by a doctor blade setting a gap between the polymer film and an edge of the blade to be 287 μm. The catalyst layer was obtained by drying the coated ink in an oven at 80° C. for 60 minutes. The polymer electrolyte layer was found to have a thickness of about 25 μm by a measurement with a contact-type thickness meter.

Example 1a (Formation of the First Electrode Catalyst Layer)

A polymer film (made of ETFE: poly(ethylene-tetrafluoroethylene) copolymer) was fixed on a glass plate and the first catalyst ink was coated on the polymer film by a doctor blade setting a gap between the polymer film and an edge of the blade to be 125 μm. As soon as it was coated, the coated ink was dried in an oven at 70° C. for 5 minutes so that the first catalyst layer was obtained. A residual solvent in the first electrode catalyst layer at this time corresponded to 7.4% by mass of the coated catalyst ink.

(Formation of the Polymer Electrolyte Layer)

The polymer film on which the first electrode catalyst layer had been formed was fixed on a glass plate and the polymer electrolyte ink was coated on the first electrode catalyst layer by a doctor blade setting a gap between the first electrode catalyst layer and an edge of the blade to be 287 μm. As soon as it was coated, the coated ink was dried in an oven at 60° C. for 5 minutes so that the electrolyte layer was obtained. A residual solvent in the electrolyte layer at this time corresponded to 5.4% by mass of the coated electrolyte ink.

(Formation of the Second Electrode Catalyst Layer)

The polymer film on which the first electrode catalyst layer and the polymer electrolyte layer were formed was fixed on a glass plate and the second catalyst ink was coated on the polymer electrolyte layer by a doctor blade setting a gap between the polymer electrolyte layer and an edge of the blade to be 287 μm. As soon as it was coated, the coated ink was dried in an oven at 60° C. for 5 minutes so that the second electrode catalyst layer was obtained.

Example 1b (Formation of the First Electrode Catalyst Layer)

A polymer film (made of ETFE: poly(ethylene-tetrafluoroethylene) copolymer) was fixed on a glass plate and the first catalyst ink was coated on the polymer film by a doctor blade setting a gap between the polymer film and an edge of the blade to be 125 μm. As soon as it was coated, the coated ink was dried in an oven at 70° C. for 5 minutes so that the first catalyst layer was obtained. A residual solvent in the first electrode catalyst layer at this time corresponded to 7.4% by mass of the coated catalyst ink.

(Formation of the Polymer Electrolyte Layer)

The polymer film on which the first electrode catalyst layer had been formed was fixed on a glass plate and the polymer electrolyte ink was coated on the first electrode catalyst layer by a doctor blade setting a gap between the first electrode catalyst layer and an edge of the blade to be 287 μm. The coated ink was dried in a drying machine under a vacuum condition at 80° C. for 10 minutes so that the electrolyte layer was obtained. A residual solvent in the electrolyte layer at this time corresponded to 3.7% by mass of the coated electrolyte ink.

(Formation of the Second Electrode Catalyst Layer)

The polymer film on which the first electrode catalyst layer and the polymer electrolyte layer had been formed was fixed on a glass plate and the second catalyst ink was coated on the polymer electrolyte layer by a doctor blade setting a gap between the polymer electrolyte layer and an edge of the blade to be 287 μm. As soon as it was coated, the coated ink was dried in an oven at 60° C. for 5 minutes so that the second electrode catalyst layer was obtained.

(Comparison of the Cross Sectional Views Between MEAs in Examples 1a and 1b)

Figure 4:
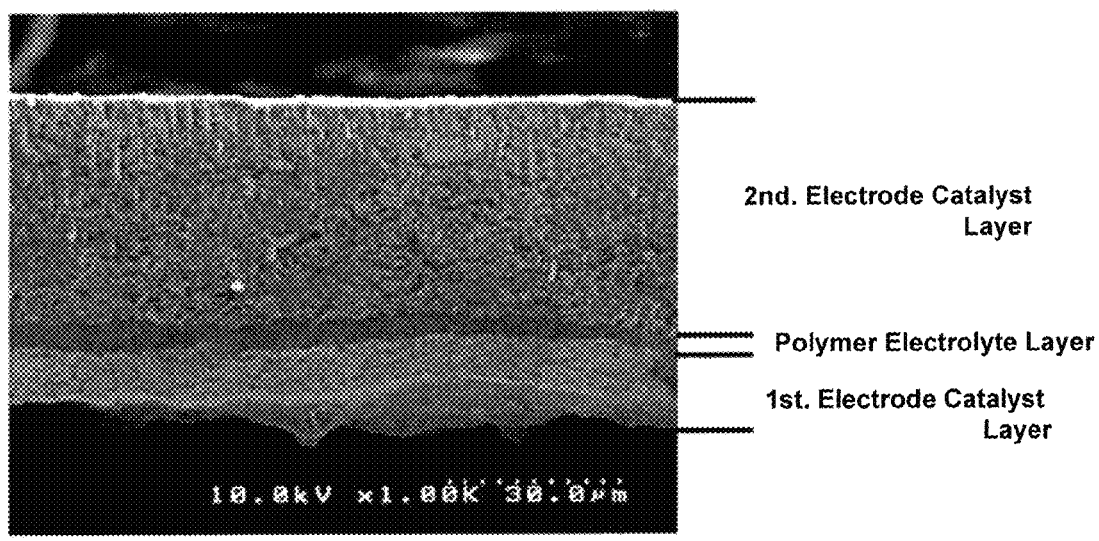
FIG. 4 is a scanning electron microscope (SEM) picture of a cross section of an MEA manufactured by a sequential stacking method described in Example 1-a.
Figure 5:
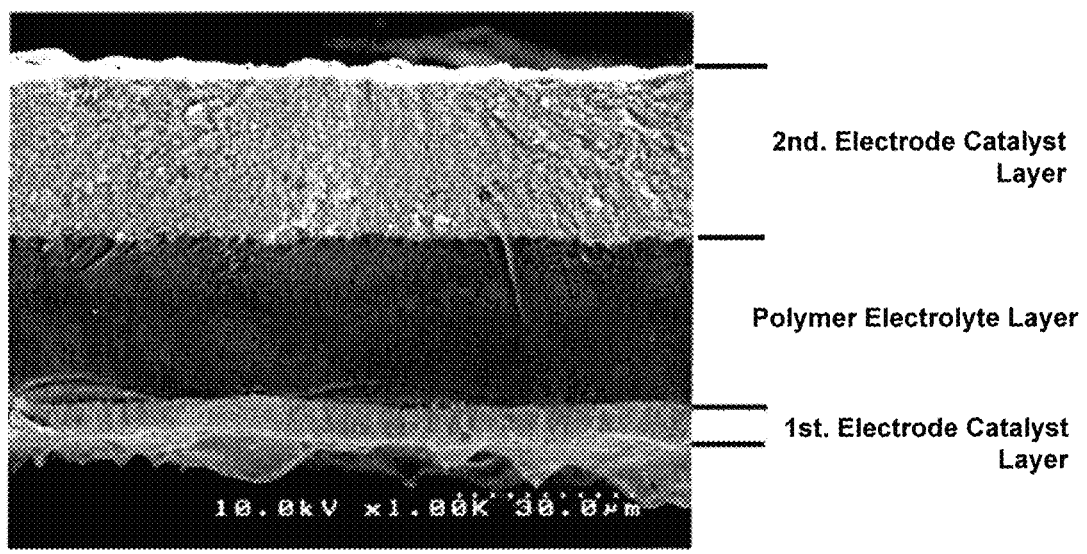
FIG. 5 is a scanning electron microscope (SEM) picture of a cross section of an MEA manufactured by a sequential stacking method described in Example 1-b.

FIG. 4 is a scanning electron microscope (SEM) picture of the MEA manufactured by the process of the sequential stacking in Example 1a. FIG. 5 is a SEM picture of the MEA obtained by the process of the sequential stacking in Example 1b.

As a result, it was discovered that the MEA manufactured by the process of the sequential stacking in Example 1a had a polymer electrolyte layer of only 5 μm in thickness. In other words, it was confirmed that the polymer electrolyte membrane and the second electrode catalyst layer were mixed together to a significant degree. Whereas the MEA manufactured by the process of the sequential stacking in Example 1b had a polymer electrolyte layer with a thickness of 27 μm, which was almost the same as the thickness of the layer obtained in the previous section (thickness of the polymer electrolyte layer), and it was confirmed that the polymer electrolyte membrane and the second catalyst layer were hardly mixed together.

Example 2 and Comparative Example 1

Example 2

(Preparation of the Catalyst Ink)

Platinum loaded carbon catalysts and 20% by mass of polymer electrolyte solution (Nafion: a registered trademark and a product by Dupont.) was mixed in a solvent. A dispersing treatment was performed by a planetary ball mill. The pot and the balls of the ball mill were made of zirconium.

The catalyst ink was prepared by making the composition ratio by mass of the platinum loaded carbon catalysts and the polymer electrolyte (Nafion: a registered trademark and a product by Dupont.) become 2:1 and dispersing them in a solvent. The solvent was prepared by blending 1:1 in volume of ethanol and methanol. In addition, the amount of the solid content was made to 10% by mass.

(The Substrate)

A polymer film (made of ETFE: poly(ethylene-tetrafluoroethylene) copolymer) attached to a glass with a tackiness adhesive agent was used as a base substrate.

(Fabrication of the First Electrode Catalyst Layer)

The base substrate was fixed on a plate and the catalyst ink was coated on the base substrate by a doctor blade setting a gap between the base substrate and an edge of the blade to be 125 μm. The coated ink was dried in an oven at 70° C. for 5 minutes so that the first electrode catalyst layer was obtained.
(Fabrication of the Polymer Electrolyte Layer)

The base substrate on which the first electrode catalyst layer was formed was fixed on a plate and the polymer electrolyte solution (viscosity: 136 cP) was coated on the first electrode catalyst layer by a doctor blade setting a gap between the first electrode catalyst layer and an edge of the blade to be 287 μm. The coated ink was dried with a drying rate of 90 wt %/min. in an oven at 85° C. so that the electrolyte layer was obtained.
(Fabrication of the Second Electrode Catalyst Layer)

The base substrate on which the first electrode catalyst layer and the polymer electrolyte layer was formed was fixed on a plate and the catalyst ink was coated on the polymer electrolyte layer by a doctor blade setting a gap between the polymer electrolyte layer and an edge of the blade to be 287 μm. The coated ink was dried in an oven at 60° C. so that the second electrode catalyst layer was obtained.

Comparative Example 1

Comparative example 1 is described below. The same base substrate and catalyst ink as those in Example 2 were used in Comparative example 1.
(Fabrication of the First Electrode Catalyst Layer)

The base substrate was fixed on a plate and the catalyst ink was coated on the base substrate by a doctor blade setting a gap between the base substrate and an edge of the blade to be 125 μm. The coated ink was dried in an oven at 70° C. for 5 minutes so that the first electrode catalyst layer was obtained.
(Fabrication of the Polymer Electrolyte Layer)

The base substrate on which the first electrode catalyst layer was formed was fixed on a plate and the polymer electrolyte solution was coated on the first electrode catalyst layer by a doctor blade setting a gap between the first electrode catalyst layer and an edge of the blade to be 287 μm. The coated ink was dried with a drying rate of 20 wt %/min. in an oven at 40° C. so that the electrolyte layer was obtained.
(Fabrication of the Second Electrode Catalyst Layer)

The base substrate on which the first electrode catalyst layer and the polymer electrolyte layer was formed was fixed on a plate and the catalyst ink was coated on the polymer electrolyte layer by a doctor blade setting a gap between the polymer electrolyte layer and an edge of the blade to be 287 μm. The coated ink was dried in an oven at 60° C. so that the second electrode catalyst layer was obtained.
(Power Generation Performance)

The MEA obtained by peeling off and removing the base substrate was arranged between a pair of carbon cloths as the gas diffusion layers to paste together and was set in a power generation evaluation cell (made by NF Corp.). A current-voltage relation of the cell was measured by fuel cell measurement equipment (GFT-SG1: a product made by Toyo Corp.) at a cell temperature of 80° C. and under the following operating conditions: Hydrogen and air were used as the fuel gas and the oxidant gas, respectively, and their flows were controlled in such a way that consumption rates became constant. A back-pressure was set to 100 kPa. A humidifier was operated so as to make the humidity 100% RH on the anode and the cathode.

Power generation performances of the MEAs obtained in Example 2 and Comparative example 1 were measured. As a result, it was confirmed that a flooding phenomenon was less likely to occur on the MEA obtained in Example 2.

Hence, the present invention prevented the polymer electrolyte from seeping or intruding (entering) into the porous first electrode catalyst layer by a rapid drying of the polymer electrolyte layer. Consequently, the gases diffused better and power generation performance was improved.

Example 3 and Comparative Example 2

Example 3

(Preparation of the Catalyst Inks)

Platinum loaded carbon catalysts and 20% by mass of polymer electrolyte solution (Nafion: a registered trademark and a product by Dupont.) was mixed in a solvent. A dispersing treatment was performed by a planetary ball mill. The pot and the balls of the ball mill were made of zirconium.

The catalyst inks were prepared by making the composition ratio by mass of the platinum loaded carbon catalysts and the polymer electrolyte (Nafion: a registered trademark and a product by Dupont.) become 2:1 and dispersing them in a solvent. The solvent was prepared by blending 1:1:1 in volume of water, ethanol and methanol.

The amount of the solid content in the first catalyst ink was made to 10% by mass. After being coated on a polytetrafluoroethylene film substrate with an applicator having a 125 μm of gap, the first catalyst ink was dried at 50° C. It took 500 seconds to concentrate the ink to contain only 3% by mass of residual solvent. The Peclet number Pe was 210 at this time.

The polymer electrolyte solution was coated on the first electrode catalyst layer on the polytetrafluoroethylene film substrate with an applicator having a 280 μm of gap. The coated solution was dried so that a polymer electrolyte layer was formed.

Figure 6:
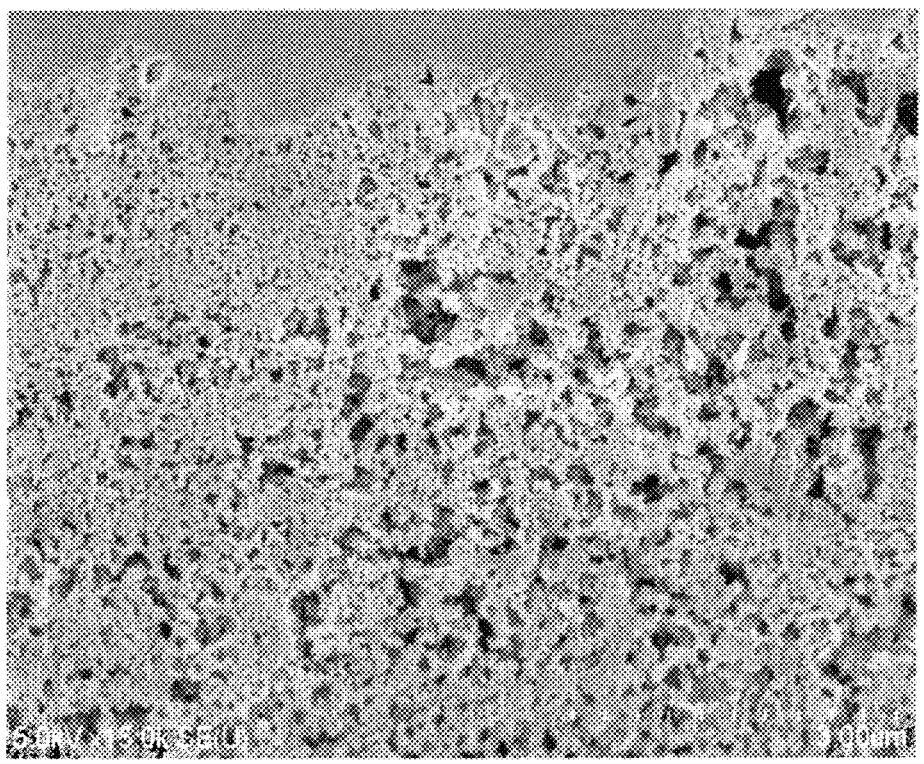
FIG. 6 is a SEM picture of a cross section of a second electrode catalyst layer of an MEA obtained in Example 3.

Next, the amount of the solid content in the second catalyst ink was made to 8% by mass. The second catalyst ink was coated on the polymer electrolyte layer on the polytetrafluoroethylene film substrate with an applicator in such a way that the coated second catalyst layer had a 140 μm wet thickness. Then the coated second catalyst layer was dried at 60° C. to obtain the second electrode catalyst layer. It took 300 seconds to concentrate the coated second catalyst layer to contain only 3% by mass of residual solvent. The Peclet number Pe was 493 at this time. FIG. 6 is a SEM picture showing a cross section of the second electrode catalyst layer at this time.

Comparative Example 2

Next, Comparative example 2 is described.
(Preparation of the Catalyst Inks)

Platinum loaded carbon catalysts and 20% by mass of polymer electrolyte solution (Nafion: a registered trademark and a product by Dupont.) was mixed in a solvent. A dispersing treatment was performed by a planetary ball mill. The pot and the balls of the ball mill were made of zirconium.

The catalyst inks were prepared by making the composition ratio by mass of the platinum loaded carbon catalysts and the polymer electrolyte (Nafion: a registered trademark and a product by Dupont.) become 2:1 and dispersing them in a solvent. The solvent was prepared by blending 1:1:1 in volume of water, ethanol and methanol.

The amount of the solid content in the first catalyst ink was made to 8% by mass. After being coated on a polytetrafluoroethylene film substrate with an applicator having a 140 μm gap, the first catalyst ink was dried at 80° C. It took 150 seconds to concentrate the ink to contain only 3% by mass of residual solvent. The Peclet number Pe was 930 at this time.

The polymer electrolyte solution was coated on the first electrode catalyst layer on the polytetrafluoroethylene film substrate with an applicator having a 280 μm gap. The coated solution was dried so that a polymer electrolyte layer was formed.

Figure 7:
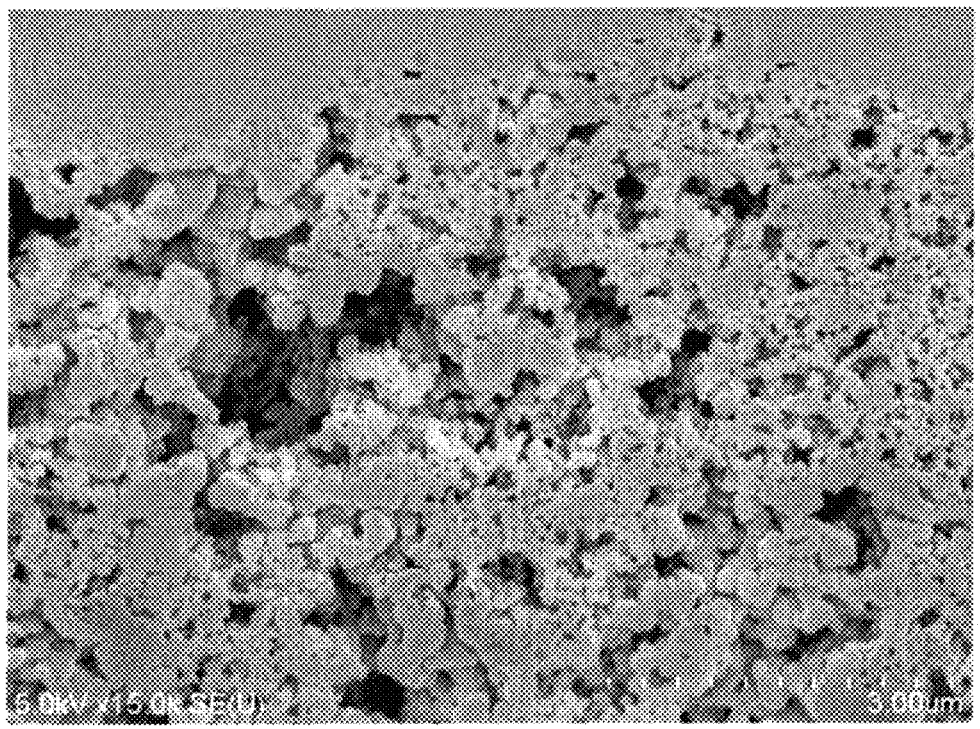
FIG. 7 is a SEM picture of a cross section of a second electrode catalyst layer of an MEA obtained in Comparative example 2.

Next, the amount of the solid content in the second catalyst ink was made to 14% by mass. The second catalyst ink was coated on the polymer electrolyte layer on the polytetrafluoroethylene film substrate with an applicator in such a way that the coated second catalyst layer had a 150 μm wet thickness. Then the coated second catalyst layer was dried at 100° C. to obtain the second electrode catalyst layer. It took 75 seconds to concentrate the coated second catalyst layer to contain only 3% by mass of residual solvent. The Peclet number Pe was 1788 at this time. FIG. 7 is a SEM picture showing a cross section of the second electrode catalyst layer at this time.

Comparing Example 3 and Comparative example 2, it is observed in FIG. 6 that uniform fine pores are spread throughout the electrode catalyst layer whereas in FIG. 7 pore sizes are uneven and relatively large pores having diameters in the range of about 1-3 μm are observed.

Current-voltage characteristics of the MEAs obtained in Example 3 and Comparative example 2 as described above were measured. The first electrode catalyst layers were arranged as anodes at this time. The measurements were carried out at a cell temperature of 80° C., with 200 ml/min. of hydrogen flow and 100 ml/min. of oxygen flow, under a humidified condition of 80° C. (fully humidified) both on the anode and on the cathode. The voltage at which the flooding phenomenon occurred was 0.45 V in Example 3 whereas it was 0.6 V in Comparative example 2.

The present invention makes it possible to produce MEAs having a high level of gas diffusion properties and drainage properties with high production efficiency by using the first electrode catalyst layer as the anode.

Example 4 and Comparative Example 3

Example 4

(Preparation of the Catalyst Inks)

Platinum loaded carbon catalysts and 20% by mass of polymer electrolyte solution (Nafion: a registered trademark and a product by Dupont.) was mixed in a solvent. A dispersing treatment was performed by a planetary ball mill. The pot and the balls of the ball mill were made of zirconium.

The catalyst inks were prepared by making the composition ratio by mass of the platinum loaded carbon catalysts and the polymer electrolyte (Nafion: a registered trademark and a product by Dupont.) become 2:1 and dispersing them in a solvent. The solvent was prepared by blending 1:1:1 in volume of water, ethanol and methanol. The amount of the solid content in the catalyst ink was made to 10% by mass.
(Substrate)

Polytetrafluoroethylene film was used as a base substrate.

The base substrate was fixed on a plate and the catalyst ink was coated on the base substrate by a doctor blade setting a gap between the base substrate and an edge of the blade to be 125 μm. The coated ink was dried at 50° C. for 5 minutes so that the first electrode catalyst layer was obtained. Pore volume distributions were measured by a mercury intrusion porosimeter (Pascal140+240 made by ThermoQuest Italia S.p.A.). Pores of 1-10 μm in size (diameter) were included in unit weight of carbon particles in the catalyst layer by a rate of 1.5 [cc/g]. Pores of 0.01-1 μm in size (diameter) were included in unit weight of carbon particles in the catalyst layer by a rate of 3 [cc/g].

The polymer electrolyte solution was coated on the first electrode catalyst layer on the polytetrafluoroethylene film substrate with a doctor blade having a 287 μm gap between the doctor and the first electrode catalyst layer. The coated solution was dried so that a polymer electrolyte layer was formed.

The catalyst ink was coated on the polymer electrolyte layer on the polytetrafluoroethylene film substrate with a doctor blade having a 287 μm gap between the doctor and the electrolyte layer. Then the coated second catalyst layer was dried to obtain the second electrode catalyst layer.

Comparative Example 3

Next, Comparative example 3 is described. The same substrate and catalyst inks as those in Example 4 were used.

The base substrate was fixed on a plate and the catalyst ink was coated on the base substrate by a doctor blade setting a gap between the base substrate and an edge of the blade to be 125 μm. The coated ink was dried at 90° C. for 1.5 minutes so that the first electrode catalyst layer was obtained. Pore volume distributions were measured by a mercury intrusion porosimeter (Pascal140+240 made by ThermoQuest Italia S.p.A.). Pores of 1-10 μm in size (diameter) were included in unit weight of carbon particles in the catalyst layer by a rate of 3.5 [cc/g]. Pores of 0.01-1 μm in size (diameter) were included in unit weight of carbon particles in the catalyst layer by a rate of 4.1 [cc/g].

The polymer electrolyte solution was coated on the first electrode catalyst layer on the polytetrafluoroethylene film substrate with a doctor blade having a 287 μm gap between the doctor and the first electrode catalyst layer. The coated solution was dried so that a polymer electrolyte layer was formed.

The catalyst ink was coated on the polymer electrolyte layer on the polytetrafluoroethylene film substrate with a doctor blade having a 287 μm gap between the doctor and the electrolyte layer. Then the coated second catalyst layer was dried to obtain the second electrode catalyst layer.

Current-voltage characteristics of the MEAs obtained in Example 4 and Comparative example 3 as described above were measured. The first electrode catalyst layers were arranged as anodes at this time. The measurements were carried out at a cell temperature of 80° C., with 200 ml/min. of hydrogen flow and 100 ml/min. of oxygen flow, under a humidified condition of 80° C. (fully humidified) both on the anode and on the cathode. The voltage, at which the flooding phenomenon occurred was 0.45 V in Example 4 whereas it was 0.55 V in Comparative example 3.

Figure 8:
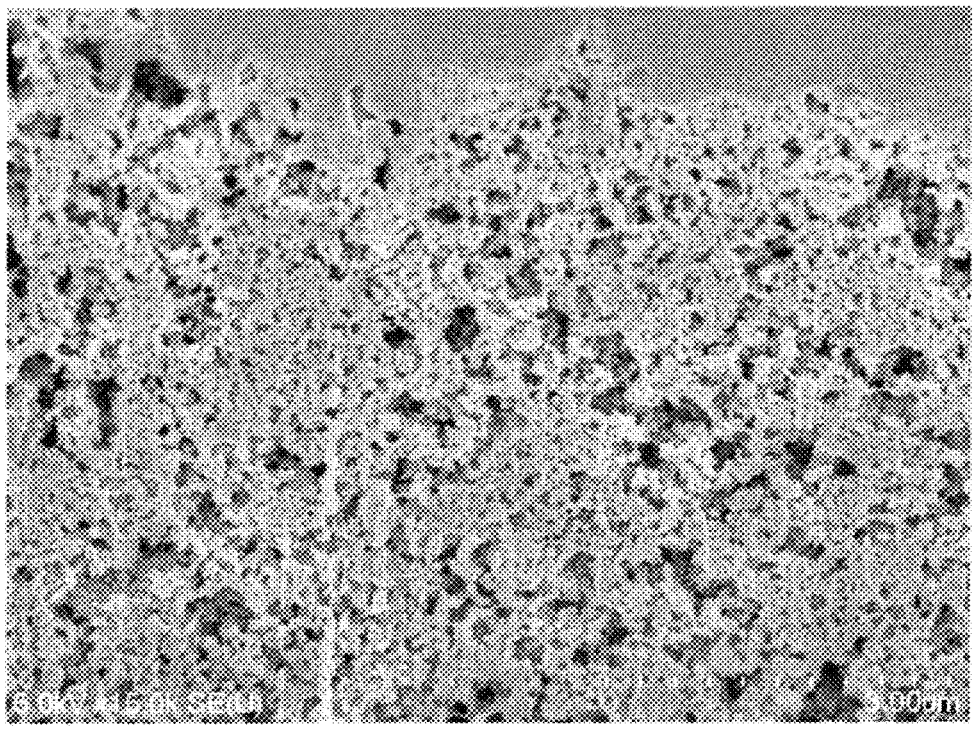
FIG. 8 is a SEM picture of a cross section of a first electrode catalyst layer of an MEA obtained in Example 4.
Figure 9:
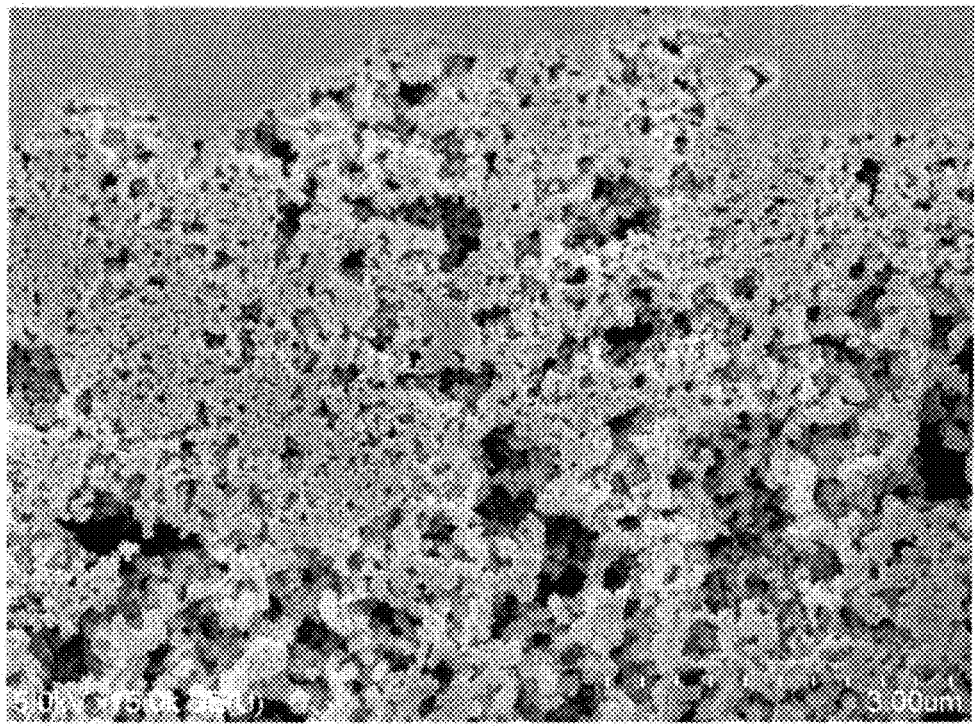
FIG. 9 is a SEM picture of a cross section of a first electrode catalyst layer of an MEA obtained in Comparative example 3.

FIG. 8 is a microscope picture of a cross section of the first electrode catalyst layer in the MEA obtained in Example 4. Whereas FIG. 9 is a microscope picture of a cross section of the first electrode catalyst layer in the MEA obtained in Comparative example 3. A difference in pore distribution between the first electrode catalyst layers in Example 4 and in Comparative example 3 can be observed.

The present invention makes it possible to produce MEAs having high level of gas diffusion properties and drainage properties with high production efficiency by using the first electrode catalyst layer to the anode as is seen in this Example.

The present invention can be applied to a PEFC which is used in an electric car, a cell phone, a vending machine, an underwater robot, a submarine, a space ship, an underwater transporter or a power supply for an underwater base.

What is claimed is:

1. A method for manufacturing an MEA in which a polymer electrolyte membrane is arranged between a first electrode catalyst layer and a second electrode catalyst layer, comprising:
   coating a first catalyst ink, which contains catalyst loaded particles, a polymer electrolyte and a solvent, on a substrate to form a coated layer of said first catalyst ink;
   removing said solvent in said coated layer of said first catalyst ink to form a first electrode catalyst layer;
   coating an electrolyte ink, which contains a polymer electrolyte and a solvent, on said first electrode catalyst layer to form a coated layer of said electrolyte ink;
   removing said solvent in said coated layer of said electrolyte ink to form a sufficiently dry polymer electrolyte membrane;
   coating a second catalyst ink, which contains catalyst loaded particles, a polymer electrolyte and a solvent, on said polymer electrolyte membrane to form a coated layer of said second catalyst ink; and
   removing said solvent in said coated layer of said second catalyst ink to form a second electrode catalyst layer, wherein said second catalyst ink has a larger amount of solid content than said first catalyst ink, wherein said second catalyst ink has solid content in the range of 6-15% by weight, and wherein said solvent in said coated layer of said electrolyte ink is removed such that only 5% by weight or less of the solvent remains in said polymer electrolyte membrane.

2. The method according to claim 1, wherein said polymer electrolyte contained in said first catalyst ink, said polymer electrolyte contained in said electrolyte ink, and said polymer electrolyte contained in said second catalyst ink include a common component material.

3. The method according to claim 1, wherein said solvent is removed at a rate of 90% by weight per minute or higher when removing said solvent in said coated layer of said electrolyte ink to form a polymer electrolyte membrane.

4. The method according to claim 3, wherein said solvent in said coated layer of said first catalyst ink is removed to an extent of 10% by weight or less relative to an initial solvent amount in said coated layer of said first catalyst ink.

5. The method according to claim 3, wherein said polymer electrolyte contained in said first catalyst ink, said polymer electrolyte contained in said electrolyte ink, and said polymer electrolyte contained in said second catalyst ink include a common component material.

6. The method according to claim 1, wherein said solvent n said coated layer of said first catalyst ink is removed under a drying condition where a Peclet number Pe is in the range of 1-500.

7. The method according to claim 6, wherein said solvent in said coated layer of said second catalyst ink is removed under a drying condition where a Peclet number Pe is in the range of 100-1000.

8. The method according to claim 6, wherein said polymer electrolyte contained in said first catalyst ink, said polymer electrolyte contained in said electrolyte ink, and said polymer electrolyte contained in said second catalyst ink include a common component material.

9. The method according to claim 1, wherein pores with a diameter of 1-10 μm in said first electrode catalyst layer have a volume in the range of 1-3 cc relative to 1 gram of carbon particles included in said first electrode catalyst layer, and pores with a diameter of 0.01-1 μm in said first electrode catalyst layer have a volume in the range of 2-6 cc relative to 1 gram of carbon particles included in said first electrode catalyst layer.

10. The method according to claim 9, wherein said polymer electrolyte contained in said first catalyst ink, said polymer electrolyte contained in said electrolyte ink, and said polymer electrolyte contained in said second catalyst ink include a common component material.

11. The method according to claim 1, wherein said polymer electrolyte membrane has a thickness of 20 μm or less.

* * * * *